Figure 1:
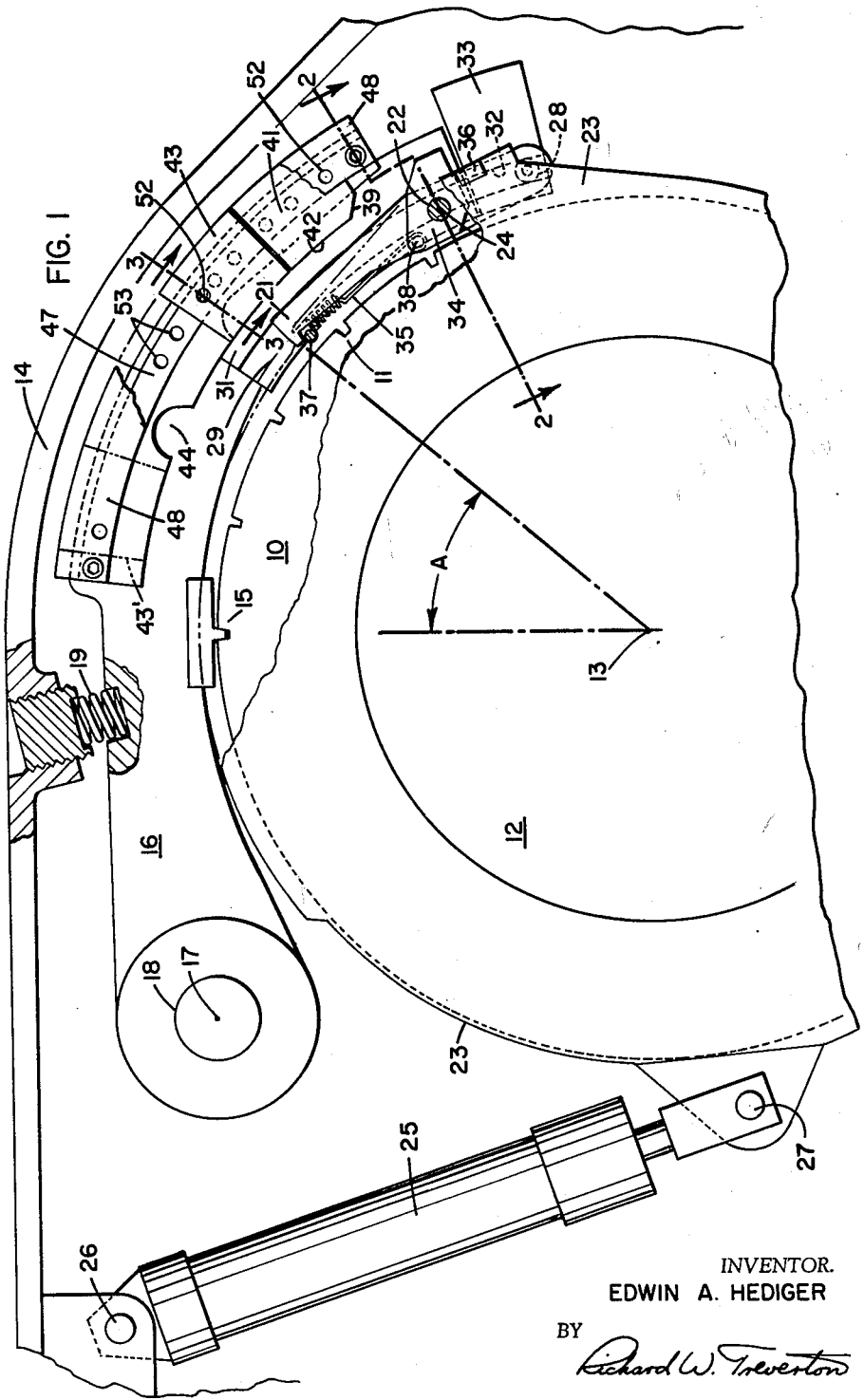

Jan. 26, 1965

E. A. HEDIGER 3,166,955

INDEX MECHANISM

Filed March 19, 1962

2 Sheets-Sheet 1

INVENTOR.
EDWIN A. HEDIGER

BY
Richard W. Treverton
ATTORNEY

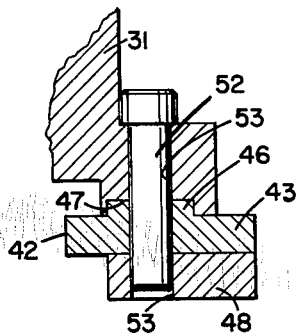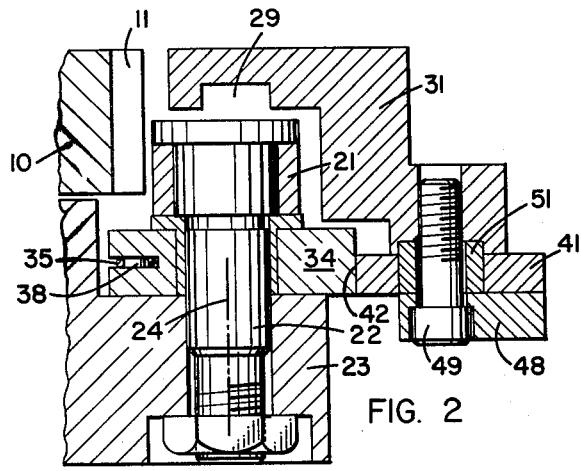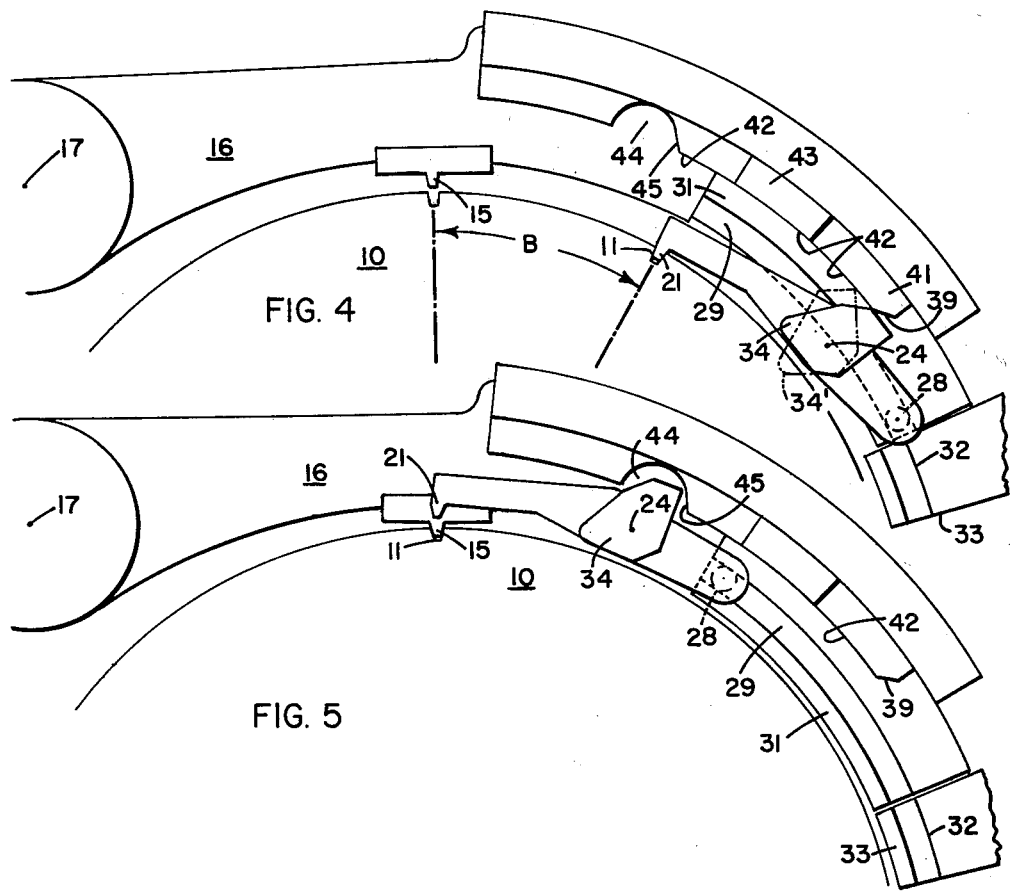

3,166,955
INDEX MECHANISM
Edwin A. Hediger, Rochester, N.Y., assignor to The Gleason Works, Rochester, N.Y., a corporation of New York
Filed Mar. 19, 1962, Ser. No. 180,737
16 Claims. (Cl. 74—822)

The present invention relates to an index mechanism for a machine tool, for example a machine for sharpening or for checking multi-bladed rotary cutters.

A primary object of the invention is a simple mechanism in which indexing and holding pawls, for alternately advancing and holding a notched index plate, are interconnected to provide positive control of the plate throughout each operating sequence; and in which the motions of the pawls to engage and disengage the plate are effected mechanically as a result of forward and return motions of the carrier of the indexing pawl.

A further object is such a mechanism which by adjustment of a cam is adapted to index through any of various index angles, corresponding to the notch spacing of a selected index plate.

A mechanism according to the invention comprises a support, a notched index plate rotatable on the support, a locking pawl movable on the support between notch-engaging and notch-disengaging positions relative to the index plate, means for urging the locking pawl to such notch-engaging position, a carrier mounted on the support for forward and return motions about the axis of rotation of the index plate, an indexing pawl movable on the carrier between notch-engaging and notch-disengaging positions relative to the index plate, a pivotal interconnection between said pawls for positively moving the indexing pawl respectively to notch-engaging position and to notch-disengaging position upon movement of the locking pawl respectively to notch-disengaging position and to notch-engaging position, a locking pawl actuator movable on the carrier, said actuator being engageable with a cam surface on the locking pawl for moving the latter to and holding it in notch-disengaging position during forward motion of the carrier and allowing it to remain in notch-engaging position during return motion of the carrier.

The foregoing and other objects and advantages of the invention will appear from the following description of the preferred embodiment shown in the accompanying drawings, wherein:

FIG. 1 is a bottom plan view, partly in section;

FIGS. 2 and 3 are detail vertical sections in the planes designated 2—2 and 3—3 in FIG. 1; and, FIGS. 4 and 5 are schematic views, in bottom plan, showing the mechanism in different phases of operation.

An index plate 10 having on its periphery a plurality of equally spaced notches 11 is detachably secured to a spindle 12 of the machine, the spindle being rotatable about its axis 13 in housing 14 which constitutes the support of the index mechanism. A locking pawl 15 is movable to notch-engaging position relative to the index plate, as shown in FIGS. 1 and 5, or to notch-disengaging position, as shown in FIG. 4, by pivotal motion of its supporting arm 16 about axis 17, the arm for this purpose being connected to the support 14 by a pivot pin 18. A coil spring 19 compressed between the support and the arm constantly urges the latter toward notch-engaging position.

An indexing pawl 21 is mounted on a pin 22 secured to a carrier 23, for pivotal motion about pin axis 24 between notch-engaging position, as shown in FIG. 4, and notch-disengaging position, as in FIGS. 1 and 5. The carrier is ring-shaped and is mounted on support 14 on anti-friction bearings, not shown, for forward and return motions through angle A about spindle axis 13, the opposite limit positions of the carrier being those in which it appears in FIGS. 1 and 5. As shown in the latter view, the pawls 15 and 21 are both substantially aligned with the same notch of the index plate when the carrier 23 is in forward or counterclockwise limit position. To prevent interference, pawl 15 overlies pawl 21, being engageable in the upper portion of notches 11 while pawl 21 is engageable in the lower portion of the notches. The forward and return motions of the carrier are effected by a fluid pressure operated cylinder-piston device 25 of fixed stroke, the cylinder of the device being pivoted at 26 to support 14 while the piston rod is pivoted at 27 to the carrier ring 23.

The pawls are so pivotally interconnected that the indexing pawl 21 is brought into engagement with the index plate while the locking pawl 15 is being disengaged, and is disengaged while the locking pawl is being engaged, so that in normal operation the index plate is always under the control of one or the other of the pawls. The connection comprises a roller 28 on pawl 21 for engagement in an arcuate guide slot 29 in a guide member 31 that is rigidly secured to and is in effect a part of arm 16 of pawl 15. Slot 29 is concentric with axis 13 when pawl 15 is in disengaged position, as in FIG. 4. A guide slot 32 formed in a block 33 rigid with support 14 is adapted to receive the roller 28 as the carrier 23 approaches its clockwise limit position, FIG. 1. For this purpose the slot 32 is aligned with and constitutes an extension of the guide slot 29 when the pawl 15 is in notch-engaging position. The arrangement is such that when roller 28 is in slot 32, or is in slot 29 and the pawl 15 is in engaged position, pawl 21 is held disengaged, as in FIGS. 1 and 5. Upon disengagement of pawl 15, by counterclockwise motion of arm 16 about pivot axis 17, the connection comprising guide slots 29 and roller 28 pivots pawl 21 counterclockwise about axis 24 to its engaged position shown in FIG. 4. When in the position shown in FIG. 1, wherein the pawl 21 is held released by guide slot 32 rather than by slot 29, the index plate may be freed for rotation (or for removal from spindle 12) by manually disengaging pawl 15.

The pin 22 for pawl 21 also pivotally supports an actuator 34 for the index pawl. The actuator is biased by a coiled tension spring 35 for clockwise pivotal motion against a fixed stop 36 on the carrier 23. One end of the spring is anchored to the carrier by a pin 37, the other end to the actuator by pin 38. The actuator is engageable with a cam surface on the locking pawl arm 16, the cam surface comprising a beveled active portion 39 on a cam block 41 secured to guide 31 and a dwell portion 42 of which a part is on guide 31, another part on block 41 and still another part on a filler cam block, 43, which also is secured to guide 31. Dwell portion 42 is of arcuate shape concentric with axis 13 when pawl 15 is in disengaged position. Adjacent its counterclockwise end, guide 31 has a recess 44 for receiving the actuator 34, in the manner shown in FIG. 5.

In operation, upon forward or counterclockwise motion of the carrier 23 from the position shown in FIG. 1, the actuator 34 backed by stop 36 engages active cam surface 39 and by cam action therewith pivots pawl 15 to notch-disengaging position, the mechanism at this time being in the condition shown in FIG. 4. As the pawl 21 is now engaged in a notch of the index plate, the latter is now coupled to and moves with the carrier, the actuator riding along cam dwell surface 42 and thereby holding the pawl 15 disengaged and the pawl 21 engaged. As the carrier approaches its counterclockwise terminal position, the actuator enter recess 44, allowing spring 19 to move pawl 15 to notch-engaging position and to simultaneously disengage pawl 21, this being the condition shown in FIG. 5. Upon return or clockwise motion of the carrier the actuator is pivoted counterclockwise about its pivot axis 24 by abutment with wall 45 of recess 44 to the inclined relation to the carrier in which it appears in broken lines at 34' in FIG. 4, thus enabling return of the carrier to the position of FIG. 1 without disengagement of the locking pawl.

The angle designated B in FIG. 4, through which the index plate advances during each operating cycle, is 30° in the particular position of active cam surface 39 shown in the drawings. To obtain other indexing angles, the cam blocks 41 and 43 need only be adjusted to different positions, and, if necessary, the index plate exchanged for one having notches spaced at the desired angle. For example, a plate having twenty-four notches is suitable for indexing angles of either 15° or 30°, but for an indexing angle of 20° must be exchanged for one having eighteen notches (or some multiple of eighteen). To enable the cam adjustment, the blocks 41 and 43 are slidable in an arcuate path on the guide 31, being for this purpose provided with arcuate ribs 46, FIG. 3, received in an arcuate groove 47 in the bottom of the guide. These ribs and groove are concentric with the axis 13 when the locking pawl is in its disengaged position. The blocks are maintained in sliding relation against the guide 31 by a gib 48 that is secured to the guide by screws 49 and spacer sleeves 51, one set of which appear in section in FIG. 2. The cam blocks may be held in any of several positions of adjustment by pins 52, one of which appears in FIG. 3, insertable in aligned openings 53 through the blocks, the guide 31 and the gib 48. Each block has one such pin-receiving opening, while the guide, as well as the gib, has several of them, spaced at intervals corresponding to the several positions of cam adjustment. In the particular mechanism illustrated, these openings in the guide and gib have been arranged for indexing angles of 30°, 25-5/7°, 22-1/2°, 18°, 15° and 12-6/7°, suitable for a sharpening or checking machine for cutters having either 12, 14, 16, 20, 24 or 28 equally spaced blades.

When cam face 39 is adjusted for an indexing angle so small that entry of the actuator 34 into the recess 44 would be obstructed by the filler block 43 positioned against block 41, the filler block is pinned in the position thereof shown by broken lines at 43' in FIG. 1.

Having now described the preferred embodiment of the novel principles involved and its mode of operation, what is claimed as the invention is:

1. An index mechanism comprising a support, a notched index plate rotatable on the support, a locking pawl movable on the support between notch-engaging and notch-disengaging positions relative to the index plate, means for urging the locking pawl to such notch-engaging position, a carrier mounted on the support for forward and return motions about the axis of rotation of the index plate, an indexing pawl movable on the carrier between notch-engaging and notch-disengaging positions relative to the index plate, a pivotal interconnection between said pawls for positively moving the indexing pawl respectively to notch-engaging position and to notch disengaging position upon movement of the locking pawl respectively to notch-disengaging position and to notch-engaging position, a locking pawl actuator movable on the carrier, said actuator being engageable with a cam surface on the locking pawl for moving the latter to and holding it in notch-disengaging position during forward motion of the carrier and allowing it to remain in notch-engaging position during return motion of the carrier.

2. A mechanism according to claim 1 in which the locking pawl has a recess adjacent said cam surface for receiving the actuator as the carrier approaches the end of its forward motion, to allow movement of the locking pawl to notch-engaging position.

3. A mechanism according to claim 1 in which the locking pawl is adapted upon return motion of the carrier to engage and move the actuator into a position on the carrier wherein it may idly pass said cam surface.

4. A mechanism according to claim 1 in which the locking pawl is pivoted to the support and the indexing pawl is pivoted to the carrier.

5. A mechanism according to claim 1 in which the actuator is pivoted to the carrier and is biased for pivotal motion into the position thereof wherein it holds the locking pawl in notch-disengaging position.

6. A mechanism according to claim 1 so arranged that both of said pawls are substantially aligned with the same notch of the index plate in the forward limit position of the carrier.

7. A mechanism according to claim 1 in which said cam surface comprises an active portion engaged by the actuator in moving the locking pawl to notch-disengaging position and an arcuate dwell portion which is concentric with said axis when the locking pawl is in said last-mentioned position.

8. A mechanism according to claim 1 in which there is a block carried by the locking pawl and which has said cam surface thereon, said block being adjustable on the locking pawl to vary the phase of forward motion of the carrier in which the locking pawl and indexing pawl are moved respectively to notch-disengaging and notch-engaging positions.

9. A mechanism according to claim 1 in which said pivotal interconnection between the pawls comprises an arcuate guide on the locking pawl which is concentric with said axis when said locking pawl is in the notch-disengaging position, and a follower for said guide on the indexing pawl.

10. A mechanism according to claim 9 in which there is a guide on the support which engages said follower in the return limit position of the carrier, said guide being a continuation of the guide on the locking pawl when the latter is in notch-engaging position.

11. A mechanism according to claim 1 in which there is a power-operated device for effecting said forward and return motions of the carrier through a fixed angle.

12. An index mechanism comprising a support, a notched index plate rotatable on the support, a locking pawl pivotal on the support between notch-engaging and notch-disengaging positions relative to the index plate, means for urging the pawl to such notch-engaging position, a carrier mounted on the support for forward and return motions about the axis of rotation of the index plate, an indexing pawl pivotal on the carrier between notch-engaging and notch-disengaging positions relative to the index plate, a pivotal interconnection between said pawls for pivoting the indexing pawl respectively to notch-engaging position and to notch-disengaging position upon pivoting of the locking pawl respectively to notch-disengaging position and to notch-engaging position, a locking pawl actuator pivotal on the carrier between an idle position and an active position, said actuator in the active position thereof being engageable with a cam surface on the locking pawl for moving the latter to and holding it in notch-disengaging position during forward motion of the carrier, and said actuator upon return motion of the carrier being pivoted to said idle position, to thereby allow return motion of the carrier with the locking pawl in notch-engaging position.

13. A mechanism according to claim 12 in which the locking pawl has a recess adjacent said cam surface for receiving the actuator as the carrier approaches the end of its forward motion, to allow pivoting of the locking pawl to notch-engaging position.

14. A mechanism according to claim 12 in which said cam surface is on a block which is adjustable upon the locking pawl to vary the phase of forward motion of the carrier in which the locking pawl and the indexing pawl are pivoted respectively to notch-disengaging and notch-engaging positions.

15. A mechanism according to claim 12 in which said pivotal interconnection between the pawls comprises a guide on one pawl and a guide follower on the other, the active surface of said guide being concentric with the spindle axis when the locking pawl and the indexing pawl are respectively in notch-disengaging position and notch-engaging position.

16. An index mechanism comprising a support, a notched index plate rotatable on the support, a locking pawl pivoted to the support for movement between notch-engaging and notch-disengaging positions relative to said plate, said pawl having thereon an arcuate guide substantially concentric with the rotation axis of said plate, a carrier mounted on the support for forward and return motions about said axis, an indexing pawl pivoted to the carrier for movement between notch-engaging and notch-disengaging positions relative to said plate, a follower on the pawl engaged with said guide to so pivotally interconnect the pawls that the indexing pawl is moved respectively to notch-engaging position and to notch-disengaging position when the locking pawl is moved to notch-disengaging position and to notch-engaging position, a pawl actuator pivoted to the carrier for movement thereon between a first position where it may cam the locking pawl to notch-disengaging position upon forward motion of the carrier and a second position wherein it may allow the locking pawl to return to notch-engaging position, and said locking pawl and actuator having cooperating formations which allow the locking pawl to move to notch-engaging position at the conclusion of the forward motion of the carrier and which pivot the actuator to said second position thereof by and upon return motion of the carrier.

References Cited in the file of this patent
UNITED STATES PATENTS
2,660,895    Waters _____ Dec. 1, 1953